(12) United States Patent
Kim et al.

(10) Patent No.: US 9,866,367 B2
(45) Date of Patent: Jan. 9, 2018

(54) COMBINER FOR USE IN MULTI-BAND BASE STATION AND METHOD FOR CONTROLLING COMBINER

(71) Applicant: KMW INC., Hwaseong-si (KR)

(72) Inventors: Jong-han Kim, Hwaseong-si (KR); Kang-ryoung Lee, Hwaseong-si (KR); Ji-myung Jung, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 15/602,118

(22) Filed: May 23, 2017

(65) Prior Publication Data

US 2017/0257207 A1    Sep. 7, 2017

Related U.S. Application Data

(63) Continuation of application No. PCT/KR2015/011298, filed on Oct. 26, 2015.

(30) Foreign Application Priority Data

Nov. 25, 2014 (KR) .......................... 10-2014-0165640

(51) Int. Cl.
*H04L 5/14* (2006.01)
*H04W 88/08* (2009.01)

(52) U.S. Cl.
CPC ............. *H04L 5/143* (2013.01); *H04W 88/08* (2013.01)

(58) Field of Classification Search
CPC ................................ H04L 5/143; H04W 88/08
See application file for complete search history.

(56) References Cited

U.S. PATENT DOCUMENTS

| 9,344,138 | B2* | 5/2016 | Guimaraes | ............... H04B 1/40 |
| 2007/0099570 | A1* | 5/2007 | Gao | .......................... H04B 1/30 |
| | | | | 455/63.1 |
| 2010/0029334 | A1 | 2/2010 | Kallberg | |
| 2010/0045402 | A1 | 2/2010 | Johansson | |
| 2015/0044964 | A1* | 2/2015 | Khan | ....................... G06F 21/35 |
| | | | | 455/41.1 |

FOREIGN PATENT DOCUMENTS

| KR | 10-2013-0070144 A1 | 6/2013 |
| WO | 2013-187811 A1 | 12/2013 |
| WO | 2014-042444 A1 | 3/2014 |

OTHER PUBLICATIONS

International Search Report for PCTKR2015/011298, dated Mar. 31, 2016, and its English translation.

* cited by examiner

*Primary Examiner* — Freshteh N Aghdam

(57) ABSTRACT

The present disclosure relates to a combiner utilized in a multi-band base station system and including a plurality of first ports assigned different frequency bands and a second port in connection with a common feeder cable, including DC signal lines each branching from each first port and the second port, control signal lines each branching from each first port and the second port, switching modules on each of the DC signal lines, modems provided on each control signal line to modulate or demodulate an input control signal, and a control unit configured to control switching of each switching module according to an operation type of the combiner. The operation type includes a first type being responsive to signal inputs through at least some of the plurality of first ports and a second type being responsive to a signal input through the second port.

19 Claims, 9 Drawing Sheets

PRIOR ART

COMBINER FOR USE IN MULTI-BAND BASE STATION AND METHOD FOR CONTROLLING COMBINER

CROSS-REFERENCE TO RELATED APPLICATIONS

The present application is a continuation of International Patent Application No. PCT/KR2015/011298, filed Oct. 26, 2015, which claims priority to Korean Patent Application No. 10-2014-0165640, filed on Nov. 25, 2014. The disclosures of the above-listed applications are hereby incorporated by reference herein in their entirety.

TECHNICAL FIELD

The present disclosure relates to a combiner for use in a multi-band base station system and a method of controlling signal input/output therein.

BACKGROUND

In the current mobile communication environment, a 4G (4th generation) LTE (Long Term Evolution) system has been introduced, in addition to 2G and 3G systems, and various mobile communication service frequency bands coexist according to communication systems or operators and countries. In addition, the base station environment has been diversified. In order to reduce the consequent operating cost of base stations, a multi-band base station system has been adopted for implementing various communication systems with a single base station.

FIG. 1 is a diagram of a conventional multi-band base station system.

The conventional multi-band base station system includes a plurality of base stations 102 and 104 using different communication standards and frequencies, and a plurality of antennas 172 and 174 corresponding to each base station. In order to transfer RF (radio frequency) signals, DC (direct current) signals, and control signals from the respective base stations 102 and 104 to each antenna, combiners 110 and 150 and modems 120 and 140 are provided between the base stations and the antennas, and the lower modem 120 located on the base station side and the upper modem 140 located on the antenna side are connected by a coaxial feeder cable.

The upper and lower combiners 110 and 150 have L and C resonance cavities formed therein in a multistage manner in accordance with frequency characteristics to separate signals of specific bands such as, for example, 2G, 3G and 4G frequency bands or to merge these signals.

Accordingly, the combiners 110 and 150 can simultaneously support service frequency signals of various communication systems for allowing multiple base stations to share one coaxial feeder cable. Therefore, an antenna tower may use a reduced length of coaxial feeder cable to save the cost of cable installation.

Meanwhile, the control unit 130 supplies a control signal for controlling antenna line devices (ALDs) 162 and 164 such as a remote electrical tilting (RET) device, and a DC signal (DC power signal) for supplying power to the ALDs 162 and 164.

The lower modem 120 functions to combine a control signal (for example, RS485 signal) and a DC signal (DC power signal) received from the control unit 130 with an RF signal received from the lower combiner 110, and to transfer the combined signals though the coaxial feeder cable.

The upper modem 140 separates the received RF signal, control signal, and DC signal to transfer the RF signal to the antennas, and to transfer the control signal and the DC signal to the ALDs 162 and 164.

FIGS. 2A and 2B are schematic diagrams of a structure of the lower combiner of FIG. 1.

Referring to FIG. 2A, the combiner 110 includes a plurality of first ports connected to respective base stations, for example, Port 1 connected to a base station using an AWS (Advanced Wireless Service) frequency band and Port 2 connected to a base station using a frequency band of 700 MHz, and a second port (Port 3) connected to a common coaxial feeder cable.

The combiner includes RF signal paths 210 and 230 and DC bypass paths 220 and 240 which are branched from the respective ports. On the RF signal paths 210 and 230, filter units 212 and 232 are provided for performing a band pass filtering on the RF signals. The RF signals having passed through the filter units 212 and 232 are output to the second port (Port 3).

Referring to FIG. 2B, each DC bypass path is branched into a DC signal line and a control signal line through which a DC signal (DC power signal) and a control signal are transferred to the second part (Port 3), respectively. A diode is installed on the DC signal line to prevent reverse current from flowing.

Since such conventional combiners include the function of reverse current prevention, the upper combiner and the lower combiner cannot have the same structure. This inhibits a common use of combiners of the same structure for the upper link and the lower link.

In addition, with the conventional combiners, increasing the number of supported service frequency bands proportionally generates more insertion loss. Antenna Interface Standards Group (AISG), which sets standards for the control interface of antenna line devices, specifies a restriction on insertion loss. Therefore, the number of supported service frequency bands cannot be increased beyond a certain number with the conventional combiner structure.

In addition, when a multi-band base station system is implemented using conventional combiners, a separate, external modem 120 or 140 needs to be installed, which complicates the system configuration.

DISCLOSURE

Technical Problem

Therefore, the present disclosure in some embodiments seeks to provide a combiner of an improved structure that can be used in common for the upper link and the lower link.

The present disclosure also seeks to provide a combiner that can overcome the restriction of insertion loss prescribed by AISG regardless of the number of supported service frequency bands.

In addition, the present disclosure seeks to provide a combiner that can simplify the configuration of a multi-band base station system by incorporating a modem.

SUMMARY

In accordance with some embodiments of the present disclosure, a combiner utilized in a multi-band base station system and including a plurality of first ports assigned different frequency bands and a second port in connection with a common feeder cable, comprises DC signal lines, control signal lines, switching modules, modems and a control unit. The DC signal lines are each configured to branch from each of the plurality of first ports and the second port with the DC signal lines branching from the first ports being connected to the DC signal line branching from the second port. The control signal lines are each configured to branch from each of the plurality of first ports and the second port. The switching modules are each provided on each of the DC signal lines. The modems are provided on each of the control signal lines to modulate or demodulate an input control signal. The control unit is configured to control switching of each of the switching modules according to an operation type of the combiner. Here, the operation type includes a first type being responsive to a signal input through at least some of the plurality of first ports and a second type being responsive to a signal input through the second port.

In accordance with another embodiment of the present disclosure, a method of controlling a signal input/output in a combiner including a plurality of first ports respectively assigned different frequency bands and a second port connected with a common feeder cable, includes identifying whether an operation type of the combiner is a first type or a second type, the first type being responsive to signals input through at least some of the plurality of first ports and the second type being responsive to a signal input through the second port, and when the identified type is the first type, transferring a DC signal of a first port through which a signal is input to the second port, and processing a control signal of the first port through which the signal is input and transferring the processed control signal over to the second port, and when the identified type is the second type, transferring a DC signal from the second port to a first port determined based on a preset information, processing a control signal from the second port and transferring the processed control signal to the first port determined.

Advantageous Effects

According to the present disclosure as described above, a common combiner can be used for both the upper link and the lower link by identifying the operation type of the combiner and accordingly controlling the switching.

Further, the present disclosure in some embodiments provides a modem installed on control signal lines of each of the first ports and the second port and thereby demodulates a control signal when input via a port, and re-modulates and outputs the demodulated signal by means of the installed modem. Therefore, the restriction on insertion loss defined by AISG can be overcome regardless of the number of supported service frequency bands.

Further, the combiner is provided with both the modem and the driver for modulation/demodulation of control signals (for example, modulation/demodulation between the OOK signal and the TTL signal) and conversion between control signals (conversion between the RS485 signal and the TTL signal), so as to simplify the configuration of the multi-band base station system.

REFERENCE NUMERALS

Figure 1:
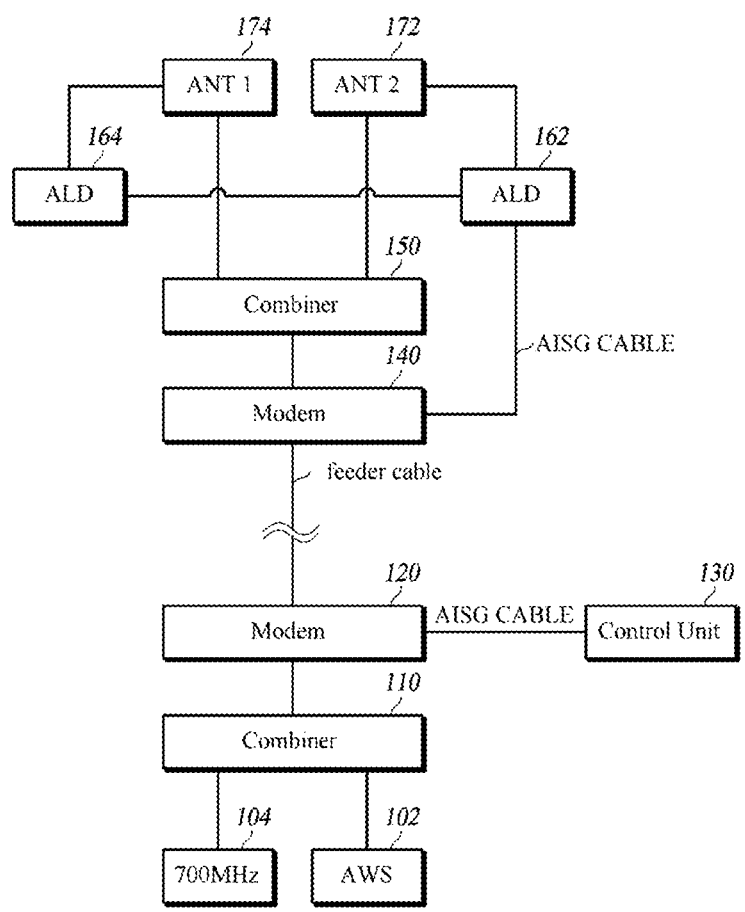
FIG. 1 is a diagram of a conventional multi-band base station system.
Figure 2A:
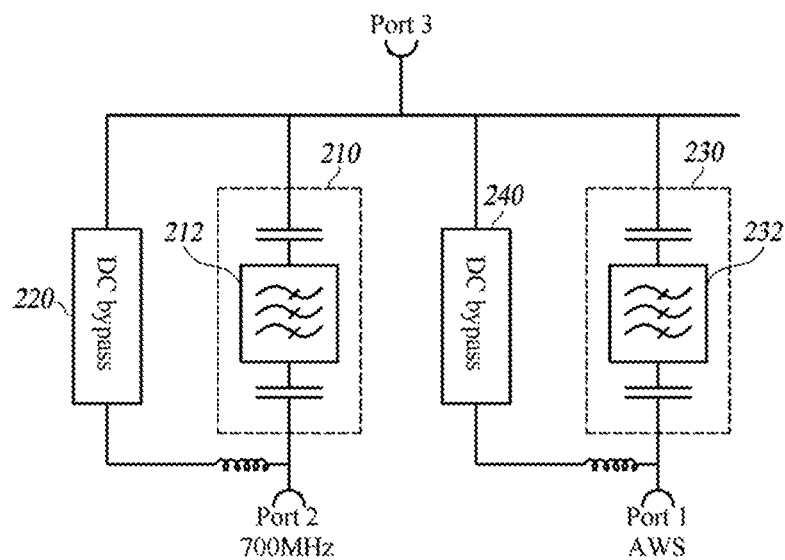
FIGS. 2A and 2B are schematic diagrams of a structure of the lower combiner of FIG. 1.
Figure 2B:
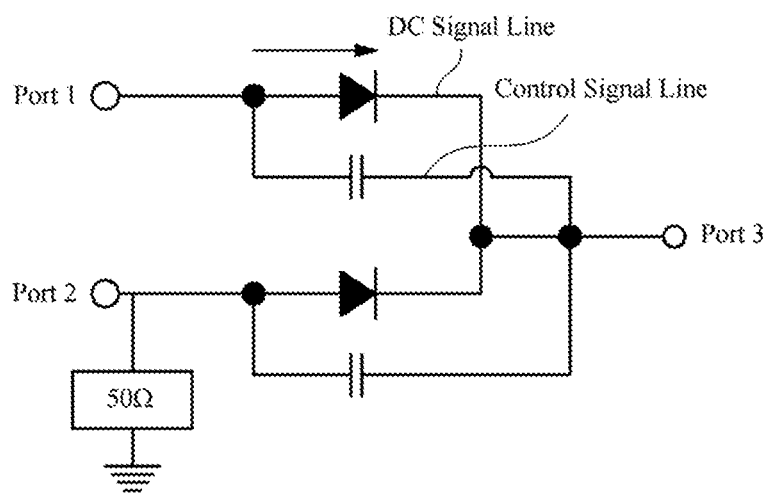

302P1-302P4, 302C: RF signal line
310P1-310P4, 310C: DC signal line
312P1-312P4, 312C: Switching module
314P1-314P4, 314C: Sensor
320P1-320P4, 320C: Control signal line
322P1-322P4, 322C: Modem
330: Control unit
340: Third port
342: Male port
344: Female port
360: Driver

DETAILED DESCRIPTION

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Figure 3:
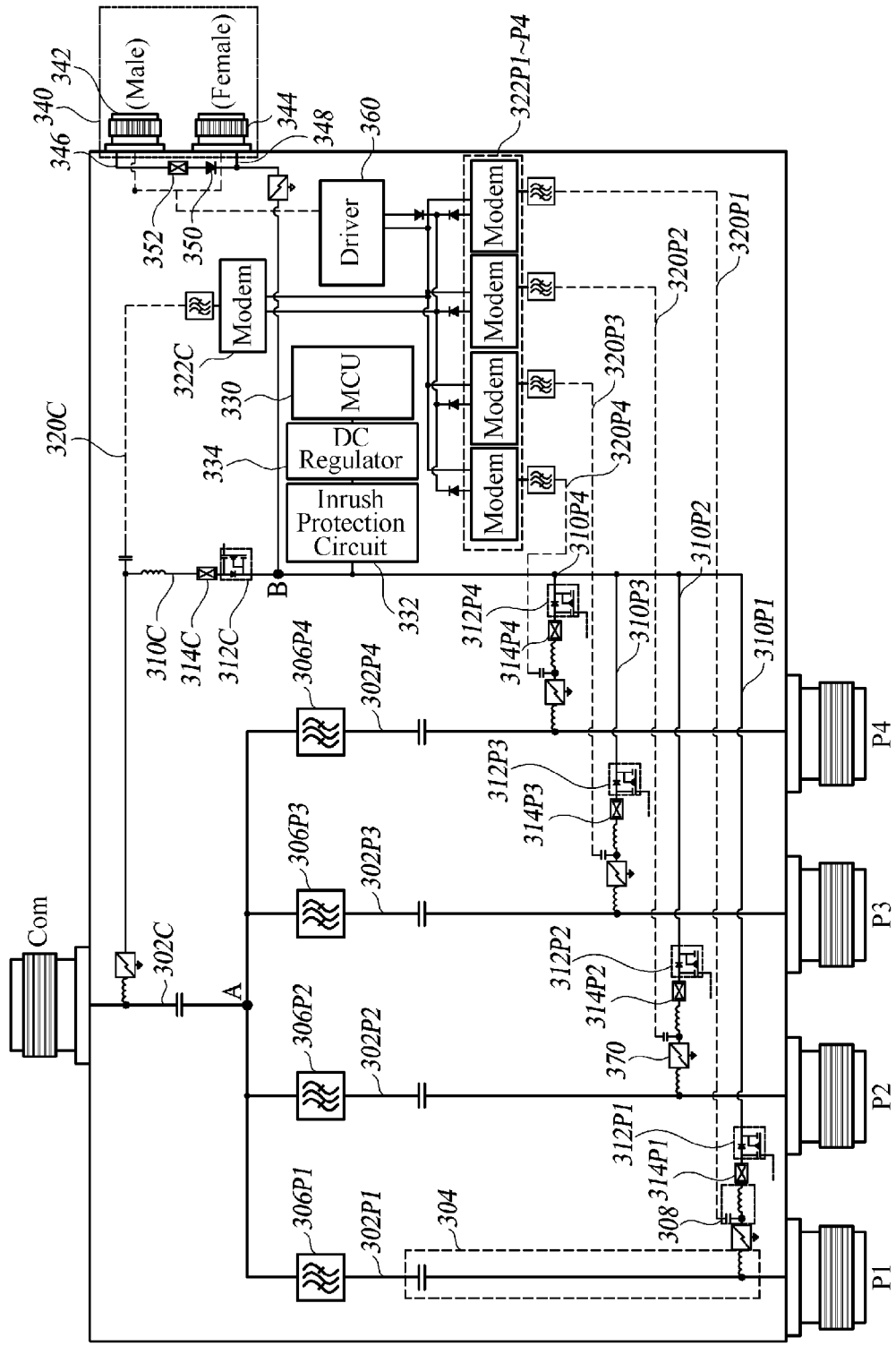
FIG. 3 is a circuit diagram of the structure of a combiner according to at least one embodiment of the present disclosure.

FIG. 3 is a circuit diagram of the structure of a combiner according to at least one embodiment of the present disclosure.

Referring to FIG. 3, a combiner according to at least one embodiment includes a plurality of first ports P1 to P4 to which different frequency bands are assigned, and a second port (Com) to which a common feeder cable is connected. Although FIG. 3 illustrates four first ports installed, the present disclosure is not limited thereto. The combiner according to the present disclosure may include two or more first ports.

Branched from the respective ports P1 to P4 and Com are RF signal lines 302P1 to 302P4 and 302C, DC signal lines 310P1 to 310P4 and 310C, and control signal lines 320P1 to 320P4 and 320C. Each signal line may be branched by bias tees 304 and 308. For example, a signal input via the first port P1 is divided into a high-frequency RF signal and a low-frequency control signal/DC signal by the bias tee 304, and the RF signal flows through the RF signal line 302P1. On the other hand, the low-frequency signal is again divided into a DC signal and a control signal by the bias tee 308, the DC signal flows through the DC signal line 310P1, and the control signal flows through the control signal line 320P1. Here, the control signals input via the first ports P1-P4 may be On-Off Keying (OOK) signals.

The RF signal lines 302P1 to 302P4 of the first ports P1 to P4 are connected to the RF signal line 302C of the second port Com which is a common port, at a contact point A. The filters 306P1 to 306P4 are installed on the RF signal lines 302P1 to 302P4 of the first ports. The filters 306P1 to 306P4 serve to perform band pass filtering of the RF signals of a service frequency band allocated to the respective first ports.

On the DC signal lines 310P1-310P4 and 310C of the respective ports P1 to P4 and Com, switching modules 312P1 to 312P4 and 312C are disposed to open and close the flow of the DC signal. The DC signal lines 310P1-310P4 of the first ports P1-P4 are connected to the DC signal line 310C of the second port Com at a contact point B. The switching modules 312P1-312P4 and 312C installed on the respective DC signal lines 310P1-310P4 and 310C may include a first path provided with a reverse current prevention unit (e.g., a diode), and a second path provided with a switch that is opened and closed under control of the control unit 330.

The control signal lines 320P1-320P4 and 320C of the respective ports P1-P4 and Com transfer the control signals input via the respective ports to the modems 322P1-322P4 and 322C. The modems 322P1-322P4 installed on the control signal lines 320P1-320P4 of the first ports P1-P4 are connected to the modem 322C installed on the control signal line 320C of the second port Com. Modems 322P1-322P4 and 322C function to modulate or demodulate the input control signals.

For example, when an OOK signal is input as a control signal, the modems 322P1-322P4 and 322C demodulate the input OOK signal into a TTL (Transistor-Transistor Logic) level digital signal. When a TTL signal is input, the modems 322P1-322P4 and 322C modulate the input TTL signal into an OOK signal. The OOK signals input via the first ports P1-P4 are demodulated into TTL signals by the modems 322P1-322P4 and then modulated into OOK signals by the modem 322C of the second port Com and output to the second port Com. An OOK signal input via the second port Com is demodulated into a TTL signal by the modem 322C of the second port Com and then modulated into an OOK signal by the first port modems 322P1-322P4 and output to the first ports P1-P4. As described above, the combiner according to at least one embodiment of the present disclosure demodulates input signals and then re-modulates and outputs the signals by providing a modem on each control signal line. Accordingly, even if the number of ports is increased, the insertion loss of output relative to input can be adjusted to a desired standard.

The control unit 330 identifies the operation type of the combiner and controls switching of the switching modules 312P1-312P4 and 312C according to the identified operation type. Here, the operation type includes a first type (hereinafter, referred to as "bottom type") of operation responsive to signals input via at least some of the plurality of first ports P1-P4 and a second type (hereinafter, referred to "top type") of operation responsive to a signal input via the second port Com.

When a DC signal and a control signal are transmitted from a base station to an antenna, the combiner that is installed on the base station side operates as a bottom type because signals are input via the first ports P1-P4. The combiner when installed on the antenna side operates as a top type because the signal is input via the second port (Com), which is a common port. That is, the combiner installed in the base station operate as a bottom type, and the combiner installed on the antenna side operates as a top type. Determination of the operation type may be performed when the combiners are installed or initialized.

Since the control unit identifies the operation type and operates the combiner according to the identified operation type, the combiner according to at least one embodiment may be commonly used on the base station side and the antenna side. A method for the control unit 330 to control the switching modules 312P1-312P4 and 312C according to the operation type will be described below with reference to FIGS. 5 and 6.

Meanwhile, the combiner according to at least one embodiment may further include a sensor configured to detect a signal flowing through each DC signal line. For example, as shown in FIG. 3, sensors 314P1-314P4 and 314C may be installed on the DC signal lines 310P1-310P4 and 310C which branch from the respective ports. When signals flowing through the respective DC signal lines are detected, the sensors may transfer the detected signals to the control unit 330.

The control unit 330 determines via which ports the signals are input by using the detected signals received from the respective sensors, and accordingly operates the modems on the control lines of the ports via which the signals are input based on the determination result to modulate or demodulate the control signals. For example, when a detected signal is received from the sensor 314P1 installed on the DC signal line 310P1 of the port P1 among the first ports, the control unit 330 operates the modem 322P1 connected to the control signal line 320P1 of the port P1. The activated modem 322P1 demodulates the control signal from the port P1 (for example, demodulates an OOK signal into a TTL signal), and transfers the demodulated control signal to the modem (322C) connected to the control signal line 320C of the second port Com. The modem 322C re-modulates the demodulated control signal (e.g., modulates the TTL signal to an OOK signal) and outputs the re-modulated signal to the second port Com through the control signal line 320C.

As the control unit 330 selectively operates the modems on the respective control signal lines in response to the detected signals input from the sensors as described above, the power consumed by the modems may be reduced.

Meanwhile, the combiner according to at least one embodiment may include a third port 340 for allowing inputs/outputs of a DC signal for supplying power to an antenna line device (ALD) such as an RET (Remote Electrical Tilting) unit and a control signal according to a communication standard (protocol) different from that for the control signals input via the first ports P1-P4. The third port 340 is connected to a control unit configured to control the ALD installed on the antenna side. The combiner may also include a driver 360 that is connected to the modem 322C installed on the control signal line of the second port Com and to the third port 340 and that converts an input control signal.

Here, the control signal input/output through the third port may be, for example, an RS485 signal conforming to the AISG standard. The driver 360 converts the RS485 signal input from the control unit via the third port 340 into a TTL signal and outputs the converted signal to the modem 322C of the second port Com. The modem 322C of the second port Com modulates the TTL signal into an OOK signal and outputs the same to the second port Com. When the TTL signal output from the modem 322C of the second port Com is input, the driver 360 converts the input TTL signal into an RS485 signal and outputs the same to the control unit through the third port 340.

The third port 340 may include a male port 342 connected to a control unit for controlling the ALD and a female port 344 connected to the ALD. For example, the combiner as installed on the base station side is connected to the control unit through the male port 342, to receive the DC signal and the control signal from the control unit. The combiner as installed on the antenna side is connected to the ALD through the female port 344, to transfer the DC signal and the control signal received from the control unit to the ALD.

The DC signal lines 346 and 348 extending from the male port 342 and the female port 344 respectively are connected to the DC signal line 310C of the second port Com at the contact point B. A reverse current prevention unit 350 configured to block the flow of reverse current and a sensor 352 configured to detect a signal flowing through the DC signal line 346 may be installed on the DC signal line 346 extending from the male port 342.

To detect a signal by the sensor 352 means that the control unit transmits the control signal and the DC signal for the ALD through the third port. In this case, the modems 322P1-322P4 of the first port P1-P4 need not be operated. Accordingly, when a signal is detected by the sensor 352, the control unit 330 may turn off all the modems 322P1-322P4 of the first ports P1-P4, thereby reducing power consumption caused by unnecessary modem operation.

Meanwhile, each DC signal line of the combiner according to at least one embodiment of the present disclosure may be provided with a surge protector 370 configured to prevent circuit damage caused by transient overvoltages.

The combiner according to at least one embodiment of the present disclosure may further include an inrush current prevention circuit 332 configured to prevent an inrush current from flowing into the control unit 330, and a regulator 334 configured to adjust the DC signal input to the control unit to a level suitable for use by the control unit 330.

Figure 4A:
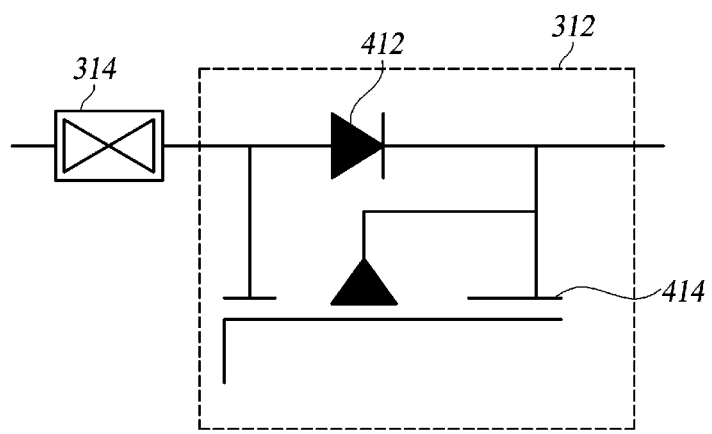
FIGS. 4A and 4B are diagrams of the arrangements between switching modules and sensors.
Figure 4B:
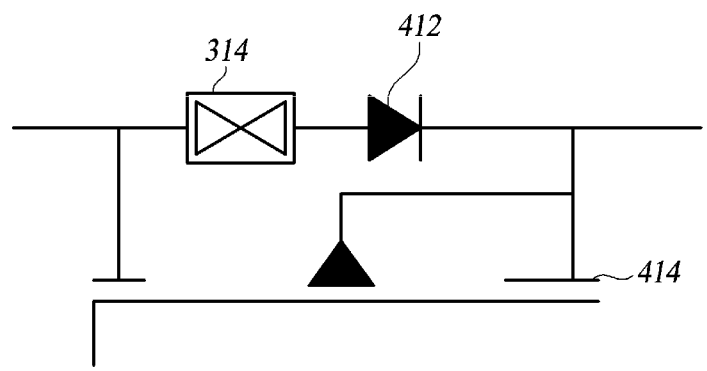

FIGS. 4A and 4B are diagrams of the arrangements between switching modules and sensors.

As shown in FIG. 4A, the switching modules 312P1-312P4 and 312C include a first path provided with a reverse current prevention unit 412 configured to block reverse current, and a second path provided with a switch 414 configured to switch on and off the flow of signal. The sensors 314P1-314P4 and 314C may be connected in series with the switching modules 312P1-312P4 and 312C.

Alternatively, as shown in FIG. 4B, the sensors 314P1-314P4 and 314C may be installed on the first path of the switching modules 312P1-312P4 and 312C.

Hereinafter, a method, performed by the control unit 330, of controlling the switching modules 312P1-312P4 and 312C according to the operation type of a combiner will be described with reference to FIGS. 5 and 6.

Figure 5:
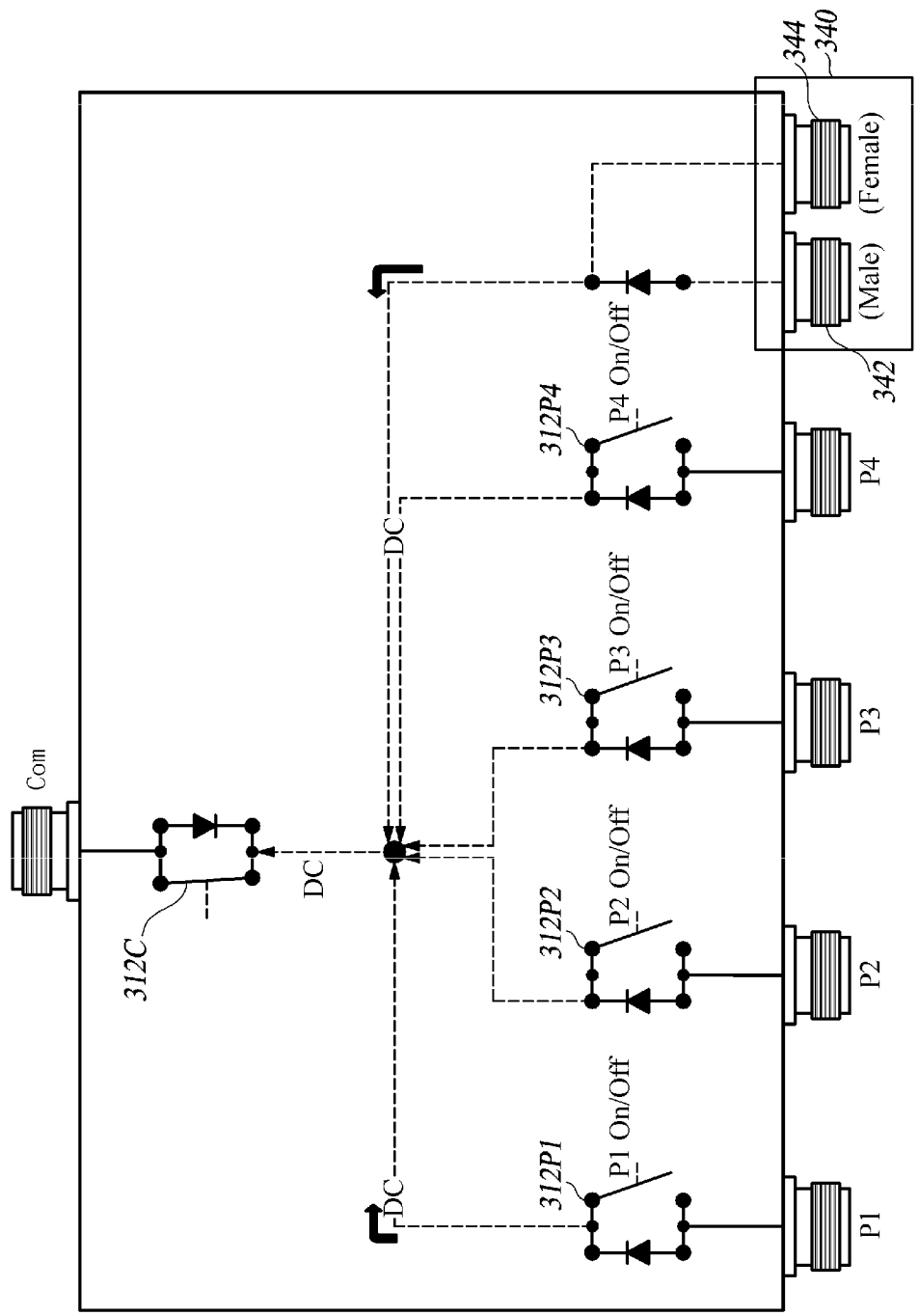
FIG. 5 is a diagram illustrating switching control performed with a combiner operating as a bottom type.
Figure 6:
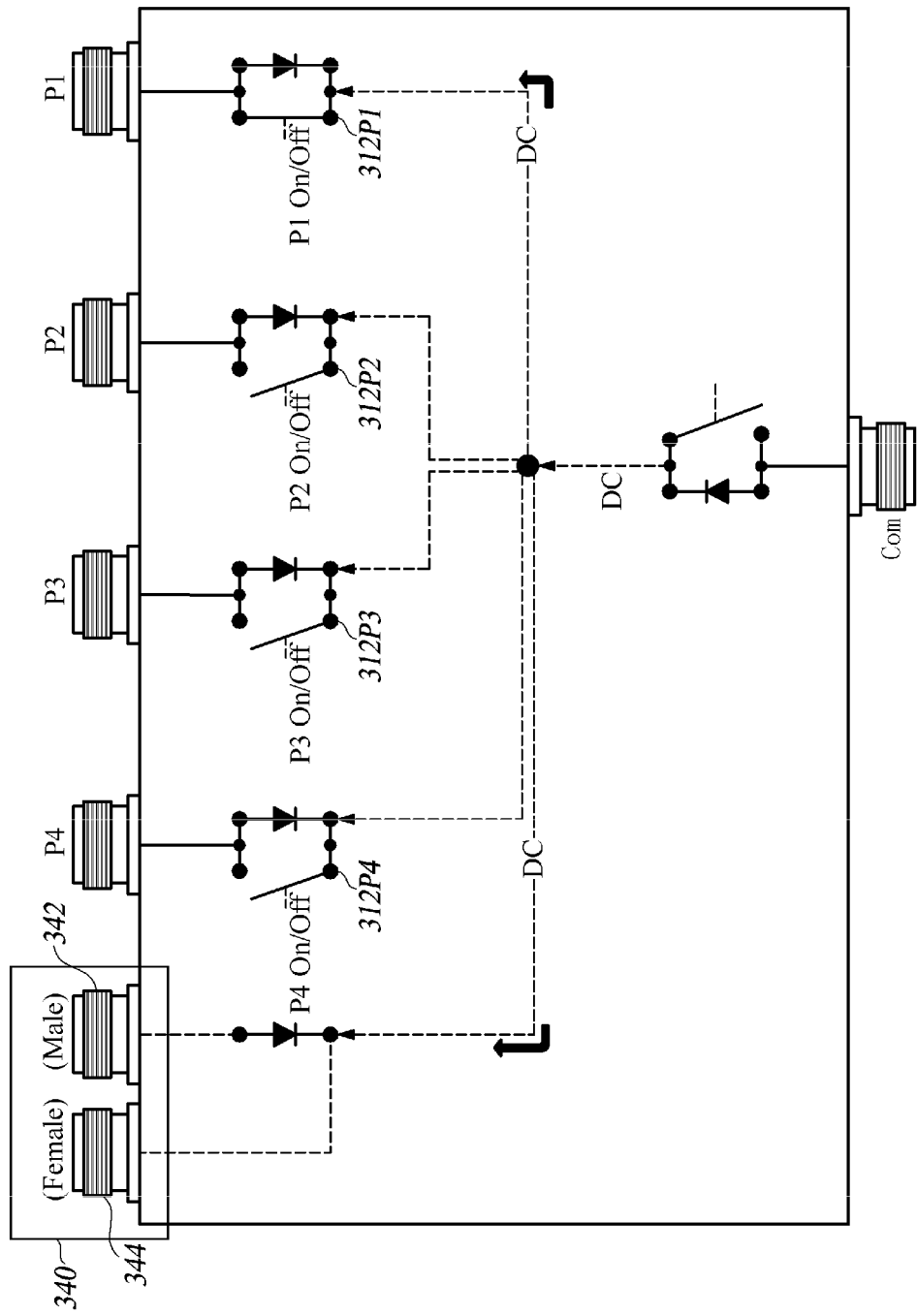
FIG. 6 is a diagram illustrating switching control performed with a combiner operating as a top type.

FIG. 5 is a diagram illustrating a switching control performed with a combiner operating as a bottom type, and FIG. 6 is a diagram illustrating another switching control performed with a combiner operating as a top type.

The control unit 330 determines whether to operate the combiner as a bottom type or a top type. For example, when initializing the combiner, the control unit 330 may determine the operation type according to whether or not a detected signal is received from the sensor 312C installed on the DC signal line 310C of the second port Com. When a detected signal is received from the sensor 312C of the second port Com, the control unit 330 determines that the combiner operates as the top type. Alternatively, when the combiner is installed, the user may be given the option to operate the combiner as the bottom type or the top type.

Referring to FIG. 5, when the combiner operates as the bottom type, the control unit 330 turns off all switches installed on the second path of the switching modules 312P1-312P4 of the first ports P1-P4, and turns on the switch 312C on the DC signal line of the second port Com.

Therefore, when a DC signal is input via the port P1 among the first ports P1-P4 and the third port, the input DC signal is transferred to the second port through the first path of the switching module 312P1. Since the signal cannot be transferred through the first path of the switching module 312C installed on the DC signal line of the second port due to the reverse current prevention unit, the DC signal is output to the second port through the second path of the switching module 312C. Meanwhile, the control unit 330 receives the detected signal from the sensor 314P1 of the first port, and accordingly operates the modem 322P1 of the first port. The activated modem 322P1 demodulates the control signal input via the first port and then transfers the demodulated control signal to the modem 322C of the second port. The modem 322C of the second port modulates the demodulated control signal, and outputs the modulated control signal to the second port.

When signals are input via a plurality of ports with the combiner operating as the bottom type, a port to operate as a primary port may be determined based on preset priorities. For example, when signals are simultaneously input via the ports P1 and P2, the modem 322P1 of the port P1 is operated to process the signal of the port P1 having higher priority. The priorities are preset as required by the system operator. Typically, the third port 340 through which the RS485 signal according to the AISG is input/output is set to have the highest priority. Therefore, when a signal is input via the male port 342 of the third port 340, all the modems 322P1-322P4 of the first ports P1-P4 are turned off. Accordingly, the control signal input via the male port 342 is transferred to the second port Com via the driver 360 and the modem 322C of the second port Com. The DC signal input via the male port 342 is transferred to the second port through the DC signal line 346 of the male port 342 and the DC signal line 310C of the second port Com.

Referring to FIG. 6, when the combiner operates as the top type, the control unit 330 turns off the switching module 312C of the second port Com, and turns on/off the switching modules 312P1-312P4 of the first port, respectively, based on preset switching information. The switching information may be set such that at least one of the switching modules 312P1-312P4 of the first port is turned on or all the switching modules 312P1-312P4 of the first port are turned off.

For example, if the switching information is set so as to turn on only the switching module 312P1 of the port P1, the switching module 312P1 of the port P1 is turned on and the switching modules 312P2-312P4 of the remaining first ports P2-P4 are turned off. Therefore, the DC signal input via the second port Com is transferred over to the first port along the first path of the switching module 312C. Since the first path of the switching modules 312P2-312P4 of the ports P2-P4 among the first ports is provided with a reverse current prevention diode and the switch of the second path is in the OFF state, the DC signal is not transferred to the ports P2-P4. Since the second path of the switching module 312P1 of the port P1 has its switch in the ON state, the DC signal input via the second port Com is output to the port P1. Meanwhile, the control unit 330 operates the modem 322P1 of the port P1. Therefore, the control signal input via the second port Com is demodulated through the modem 322C, and the demodulated control signal is modulated and output to the port P1 by the modem 322P1 of the port P1.

Figure 7:
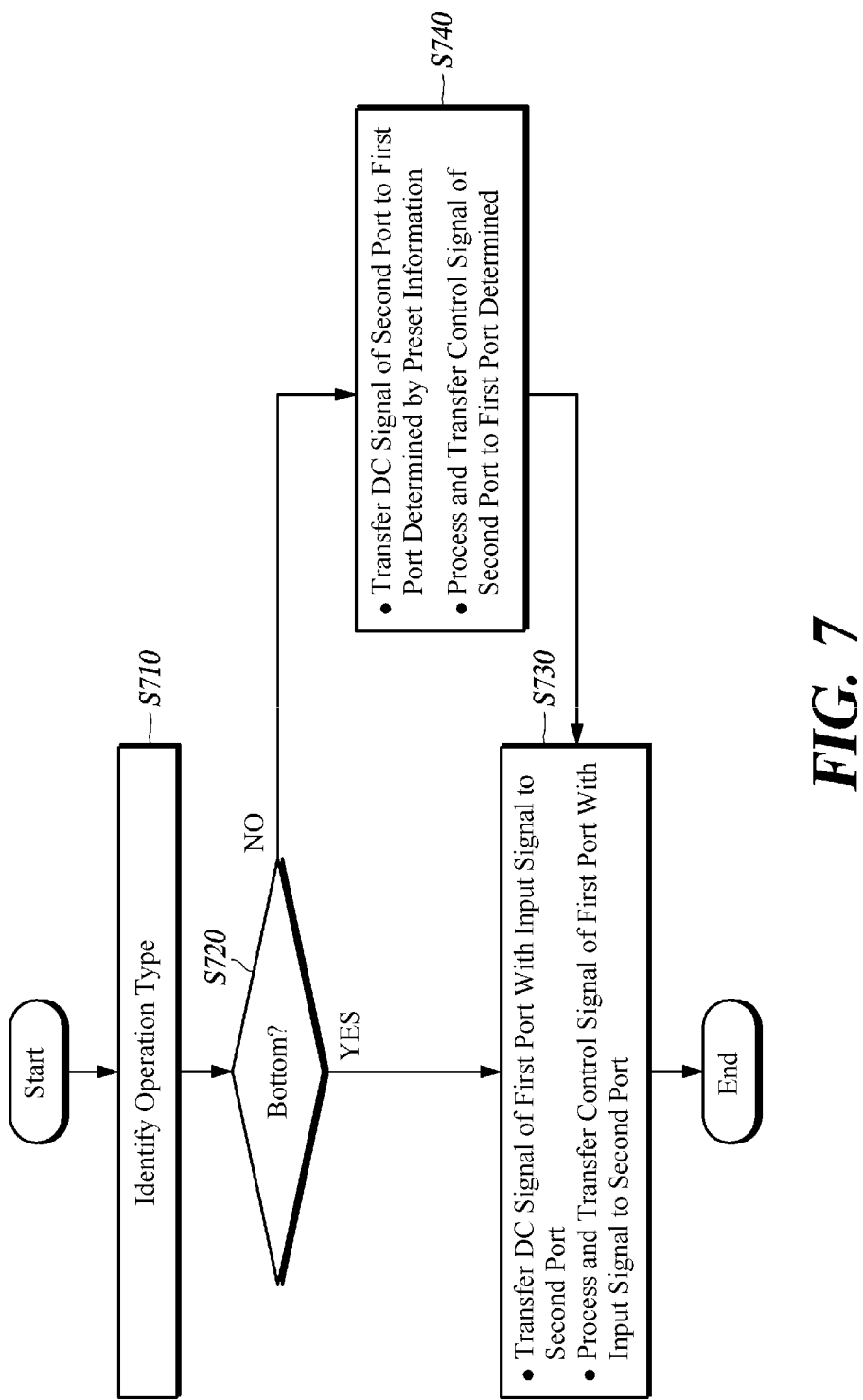
FIG. 7 is an exemplary flowchart of controlling of input and output of a DC signal and a control signal in a combiner according to at least one embodiment of the present disclosure.

FIG. 7 is an exemplary flowchart of controlling of input and output of a DC signal and a control signal in a combiner according to at least one embodiment of the present disclosure.

First, the control unit 330 of the combiner identifies the operation type of the combiner (S710). As described above, when initializing the combiner, the control unit 330 may determine the operation of the combiner as bottom type or top type depending on whether or not a signal is detected by the sensor 312C installed on the DC signal line 310C of the second port Com. Alternatively, when the combiner is installed, the user may be allowed to enter the operation type of the combiner, and the control unit 330 may identify the operation type based on the input from the user. For example, when a combiner is installed on the base station side, the user sets the operation type as bottom. When the combiner is installed at the antenna side, the user sets the operation type as top.

When the identified operation type is the bottom type, the control unit 330 controls to transfer the DC signal of the first port through which the signal is input to the second port, and also controls to process and transfer the control signal of the first port to the second port (S720, S730).

When the identified operation type is the top type, the control unit 330 controls to transfer the DC signal of the second port to the first port determined based on the preset information. The control unit also controls to process and transfer the control signal input via the second port to the first port (S720, S740).

Hereinafter, control methods will be described in detail when the combiner operates as the bottom type and the top type, respectively. Assume that a sensor is installed on each DC signal line. However, according to the foregoing description, it is obvious that providing a sensor on each DC signal line is merely an embodiment, the present disclosure is not limited to this embodiment.

Figure 8:
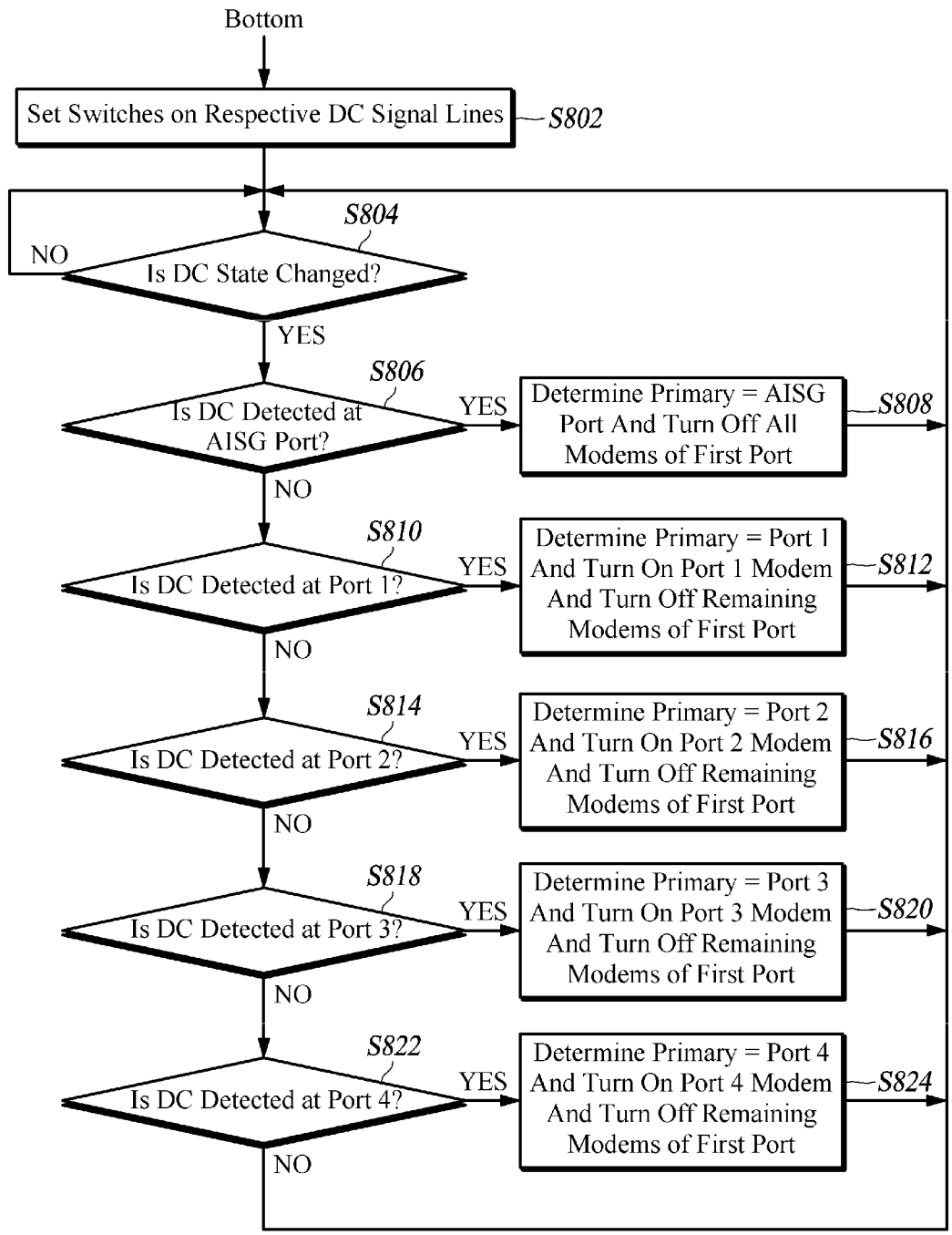
FIG. 8 is an exemplary detailed flowchart of a control method with a combiner according to at least one embodiment operating as a bottom type.

FIG. 8 is an exemplary detailed flowchart of a control method with a combiner according to at least one embodiment operating as a bottom type.

When the combiner operates as the bottom type, the control unit 330 sets the switching state of the switching module on each DC signal line to match the bottom type (S802). For example, as shown in FIG. 5, all the switching modules of the first ports are turned off and the switching modules of the second ports are turned on. Thereby, the DC signals input via the first ports are output to the second port via the first path of the switching modules and the DC signal line of the second port. The DC signal input via the third port is output to the second port via the DC signal line of the third port and the DC signal line of the second port.

Thereafter, the control unit 330 continuously checks whether or not the DC state of each DC signal line is changed, through the sensors (S804). Then, when the DC state is changed, the control unit 330 operates the modem corresponding to the port from which a signal is detected. Thus, the control signal input via the detected port is processed and output to the second port. When signals are detected from a plurality of ports, a port having the highest priority is determined as a primary port based on predetermined priorities, and the control signals are processed staring with the control signal from the port determined as the primary port. For example, if the priorities are determined in order of the third port through which the RS485 signal according to the AISG standard is input/output (hereinafter, referred to as "AISG port"), the port P1, the port P2, the port P3, and the port P4, then each modem is operated in the following manner.

First, the control unit 330 checks whether or not the DC signal of the AISG port is detected (S806). If the DC signal is detected, the control unit 330 determines the AISG port as the primary port and then all the modems of the first ports P1-P4 are turned off (S808).

If the DC signal of the AISG port is not detected, it is checked whether the DC signal of the port P1 is detected (S810). If the DC signal of the port P1 is detected, the port P1 is determined as the primary port. Then, the modem of the port P1 is turned on, and the modems of the ports P2 to P4 are turned off (S812).

If the DC signal of the port P1 is not detected, it is checked whether the DC signal of the port P2 having the next highest priority is detected (S814). If the DC signal of the port P2 is detected, the port P2 is determined as the primary port. Then, the modem of the port P2 is turned on, and the modems of the remaining ports P1, P3, and P4 are turned off (S816).

If the DC signal of the port P2 is not detected, it is checked whether the DC signal of the port P3 is detected (S818). If the DC signal of the port P3 is detected, the port P3 is determined as the primary port. Then, the modem of the port P3 is turned on, and the modems of the remaining ports P1, P2, and P4 are turned off (S820).

If the DC signal of the port P3 is not detected, it is checked whether the DC signal of the port P4 is detected (S818). If the DC signal of the port P4 is detected, the port P4 is determined as the primary port. Then, the modem of the port P4 is turned on, and the modems of the remaining ports P1 to P3 are turned off (S820).

Figure 9:
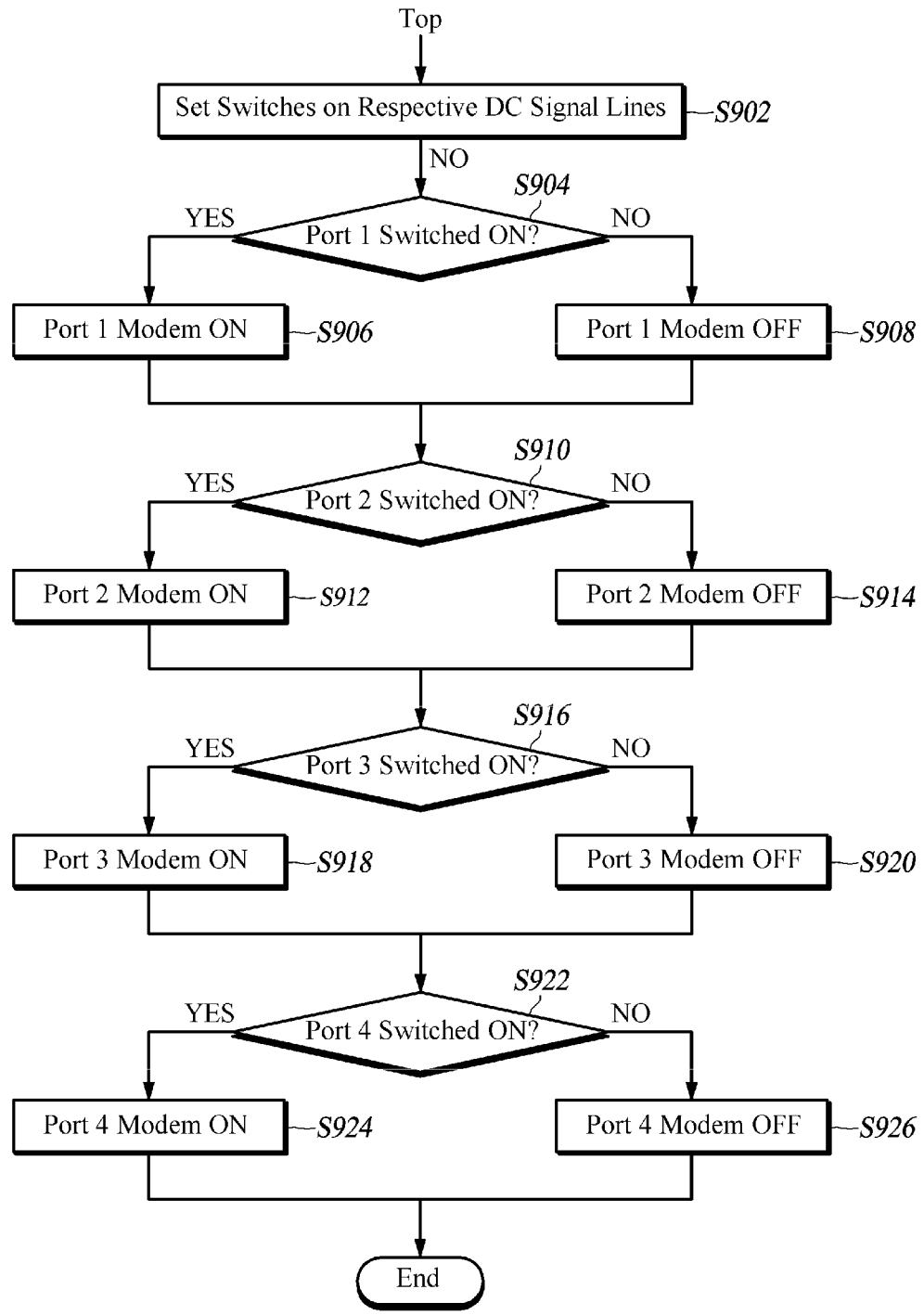
FIG. 9 is an exemplary detailed flowchart of a control method with a combiner according to at least one embodiment operating as a top type.

FIG. 9 is an exemplary detailed flowchart of a control method with a combiner according to at least one embodiment operating as a top type.

When the combiner operates as the top type, the control unit 330 sets the switching module of the second port to the off state, and sets the switching states of the switching modules on the respective DC signal lines of the first ports based on the information preset by the user (S902). As shown in FIG. 6, if the setting information is set such that only the switching module of the port P1 is set to the on state, the switching module of the port P1 is turned on and the switching modules of the ports P2-P4 are all turned off. Thereby, the DC signal input via the second port is output to the port P1 through the first path of the switching module of the second port and the second path of the switching module of the port P1.

Thereafter, the control unit 330 operates the modems of the ports whose switching modules are set to the on state. For example, it is determined whether the switching modules of the ports P1-P4 are in the on state starting with the port P1, and the modems of the ports whose switching modules are in the on state are operated (S904 to S926). Whether or not the switching module of each port is in the on state can be determined based on the preset information or based on the detected signals of the sensors installed on the DC signal lines of the respective ports. For example, when a sensor and a switching module are arranged as shown in FIG. 4A, if the switching module is in the on state, the sensor can detect whether a signal flows through the DC signal line since the DC signal flows through the second path. Therefore, it can be determine whether each switching module of the first ports is in the on state based on detected signals of the sensors installed on the DC signal lines of the first ports.

Although exemplary embodiments of the present disclosure have been described for illustrative purposes, those skilled in the art will appreciate that various modifications, additions and substitutions are possible, without departing from the idea and scope of the claimed invention. Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A combiner utilized in a multi-band base station system and including a plurality of first ports assigned different frequency bands and a second port in connection with a common feeder cable, the combiner comprising:
   DC (direct current) signal lines branching from each of the plurality of first ports and the second port, the DC signal lines branching from the first ports being connected to the DC signal line branching from the second port;
   control signal lines branching from each of the plurality of first ports and the second port;
   switching modules provided on each of the DC signal lines branching from the first ports and the second port;
   modems provided on each of the control signal lines to modulate or demodulate an input control signal; and
   a control unit configured to control switching of each of the switching modules according to an operation type of the combiner,
   wherein the operation type comprises a first type being responsive to signal inputs through at least some of the plurality of first ports and a second type being responsive to a signal input through the second port.

2. The combiner of claim 1, wherein each of the switching modules comprises:
   a first path provided with a reverse current prevention unit configured to block a flow of reverse current; and
   a second path provided with a switch opened and closed under control of the control unit.

3. The combiner of claim 1, further comprising:
   a sensor configured to detect a signal flowing through each of the DC signal lines,
   wherein the control unit operates a modem on a control signal line corresponding to a port detected by the sensor among the modems.

4. The combiner of claim 3, wherein the sensor is provided on each of the DC signal lines or on a first path of each of the switching modules.

5. The combiner of claim 2, wherein, when the operation type is the first type, the control unit is configured to:
   turn off the switches of the switching modules provided on each of the DC signal lines branching from the first ports; and
   turn on the switch of the switching module provided on the DC signal line branching from the second port.

6. The combiner of claim 3, wherein, when the operation type is the first type, the control unit is configured to:
   operate, among the modems, a modem on a control signal line corresponding to one of the first ports, on which a signal is detected by the sensor, so as to demodulate a control signal input thereinto; and
   operate, among the modems, a modem on the control signal line corresponding to the second port, so as to modulate the demodulated control signal.

7. The combiner of claim 6, wherein the input control signal is an OOK (On-Off Keying) signal,
   wherein the modem on the control signal line corresponding to one of the first ports on which the signal is detected demodulates the OOK signal into a TTL (Transistor-Transistor Logic) signal, and wherein the modem on the control signal line corresponding to the second port modulates the TTL signal into the OOK signal.

8. The combiner of claim 2, wherein, when the operation type is the second type, the control unit is configured to:
   turn off the switch of the switching module provided on the DC signal line branching from the second port; and
   control ON/OFF of the switching module on each of the DC signal lines branching from the plurality of first ports based on a preset switching information.

9. The combiner of claim 3, wherein, when the operation type is the second type, the control unit is configured to:
   operate the modem on the control signal line corresponding to the second port on which a signal is detected by the sensor, so as to demodulate a control signal input thereinto; and
   operate a modem among the modems on a control signal line corresponding to a port, a switching module on a DC signal line of which is turned on, among the first ports, so as to modulate the demodulated control signal.

10. The combiner of claim 3, wherein the control unit determines the operation type depending on whether or not a signal is detected on the DC signal line branching from the second port.

11. The combiner of claim 1, further comprising:
    a third port for input or output of a DC signal and a control signal which conforms to a communication protocol different from a communication protocol for the control signals input/output to/from the first ports and the second port; and
    a driver connected to the modem of the control signal line corresponding to the second port and connected to the third port, and configured to convert a control signal input thereinto.

12. The combiner of claim 11, wherein the control signal input/output to/from the third port is an RS485 signal,
    wherein the driver is configured to:
    convert the RS485 signal input through the third port into a TTL (Transistor-Transistor Logic) signal, and output the TTL signal to the modem on the control signal line corresponding to the second port; and
    convert the TTL signal output from the modem of the control signal line corresponding to the second port into the RS485 signal and outputs the RS485 signal to the third port.

13. The combiner of claim 11, wherein the third port comprises:
    a male port connected to a control device configured to control an antenna line device (ALD), when the operation type is the first type; and
    a female port connected to the ALD when the operation type is the second type.

14. The combiner of claim 13, further comprising:
    DC signal lines branching from each of the male port and the female port and connected to the DC signal line of the second port.

15. The combiner of claim 14, wherein the DC signal line branching from the male port comprises:
    a reverse current prevention unit configured to block a flow of reverse current.

16. The combiner of claim 14, further comprising:
    a sensor configured to detect a signal of the DC signal line branching from the male port.

17. The combiner of claim 16, wherein, when a signal is detected by the sensor on the DC signal line branching from the male port, the control unit is configured to turn off all modems provided on the control signal lines of the plurality of first ports.

18. The combiner of claim 11, wherein, when the operation type is the first type and signals are input through a plurality of ports among the first ports and the third port, the control unit is configured to process an input signal of a port determined based on a predetermined priority with the third port assigned a highest priority.

19. A method of controlling a signal input/output at a combiner including a plurality of first ports respectively assigned different frequency bands and a second port connected with a common feeder cable, the method comprising:
  identifying whether an operation type of the combiner is a first type or a second type, the first type being responsive to signals input through at least some of the plurality of first ports and the second type being responsive to a signal input through the second port;
  when an identified type is the first type, transferring a DC signal of a first port through which a signal is input among the first ports to the second port, and processing a control signal of the first port through which the signal is input for transferring to the second port; and
  when the identified type is the second type, transferring a DC signal of the second port to a first port determined based on a preset information among the first ports, and processing a control signal from the second port for transferring to the first port determined based on the preset information.

* * * * *